(12) United States Patent
Provancher et al.

(10) Patent No.: US 10,289,192 B2
(45) Date of Patent: May 14, 2019

(54) EMBEDDED GRASP SENSING DEVICES, SYSTEMS, AND METHODS

(71) Applicant: TACTICAL HAPTICS, Fremont, CA (US)

(72) Inventors: William R. Provancher, Fremont, CA (US); Michael P. Jones, Union City, CA (US)

( * ) Notice: Subject to any disclaimer, the term of this patent is extended or adjusted under 35 U.S.C. 154(b) by 0 days.

(21) Appl. No.: 15/554,668

(22) PCT Filed: Feb. 29, 2016

(86) PCT No.: PCT/US2016/020112
§ 371 (c)(1),
(2) Date: Aug. 30, 2017

(87) PCT Pub. No.: WO2016/140924
PCT Pub. Date: Sep. 9, 2016

(65) Prior Publication Data
US 2018/0067545 A1     Mar. 8, 2018

Related U.S. Application Data

(60) Provisional application No. 62/126,608, filed on Mar. 1, 2015.

(51) Int. Cl.
*G06F 3/01* (2006.01)
*A63F 13/213* (2014.01)
(Continued)

(52) U.S. Cl.
CPC ............ *G06F 3/011* (2013.01); *A63F 13/213* (2014.09); *A63F 13/214* (2014.09);
(Continued)

(58) Field of Classification Search
CPC .... G06F 3/011; G06F 3/0346; G06F 3/03547; G06F 3/04845; G06F 3/044;
(Continued)

(56) References Cited

U.S. PATENT DOCUMENTS

2002/0015024 A1* 2/2002 Westerman ........... G06F 3/0235
345/173
2006/0044259 A1   3/2006 Hotelling et al.
(Continued)

FOREIGN PATENT DOCUMENTS

WO        2014078902        5/2014

OTHER PUBLICATIONS

US Search Authority, International Search Report and Written Opinion, dated Apr. 12, 2016, PCT/US2016/020112.

*Primary Examiner* — Andrew Sasinowski
(74) *Attorney, Agent, or Firm* — Workman Nydegger

(57) ABSTRACT

Implementations of the present invention relate to apparatuses, systems, and methods for measuring the grasp state, position, or hand pose of a user's hand relative to a device, which could be used as an input for human-machine input, augmented reality, virtual reality, video games, or telemanipulation. The device may include a plurality of grasp sensors embedded within the device. A kinematic hand model can be used in combination with grasp sensing data to estimate a user's hand pose.

16 Claims, 13 Drawing Sheets

(51) Int. Cl.
  *G06F 3/03* (2006.01)
  *G06F 3/044* (2006.01)
  *G06F 3/0484* (2013.01)
  *G06F 3/0346* (2013.01)
  *G06F 3/0354* (2013.01)
  *A63F 13/24* (2014.01)
  *A63F 13/218* (2014.01)
  *A63F 13/214* (2014.01)

(52) U.S. Cl.
  CPC ............ *A63F 13/218* (2014.09); *A63F 13/24* (2014.09); *G06F 3/014* (2013.01); *G06F 3/017* (2013.01); *G06F 3/0304* (2013.01); *G06F 3/0346* (2013.01); *G06F 3/03547* (2013.01); *G06F 3/044* (2013.01); *G06F 3/04845* (2013.01); *A63F 2300/8082* (2013.01); *G06F 2203/0339* (2013.01)

(58) Field of Classification Search
  CPC ........ G06F 3/0304; G06F 3/017; G06F 3/014; G06F 2203/0339; A63F 13/218; A63F 13/24; A63F 13/214; A63F 13/213; A63F 2300/8082
  See application file for complete search history.

(56) References Cited

U.S. PATENT DOCUMENTS

| | | | |
|---|---|---|---|
| 2006/0161870 A1* | 7/2006 | Hotelling | G06F 3/0485 715/863 |
| 2010/0245246 A1* | 9/2010 | Rosenfeld | G06F 3/03543 345/163 |
| 2010/0315337 A1 | 12/2010 | Ferren et al. | |
| 2012/0019478 A1* | 1/2012 | Bulea | G06F 3/0416 345/174 |
| 2012/0139708 A1 | 6/2012 | Paradiso et al. | |
| 2013/0307789 A1 | 11/2013 | Sharma et al. | |

* cited by examiner

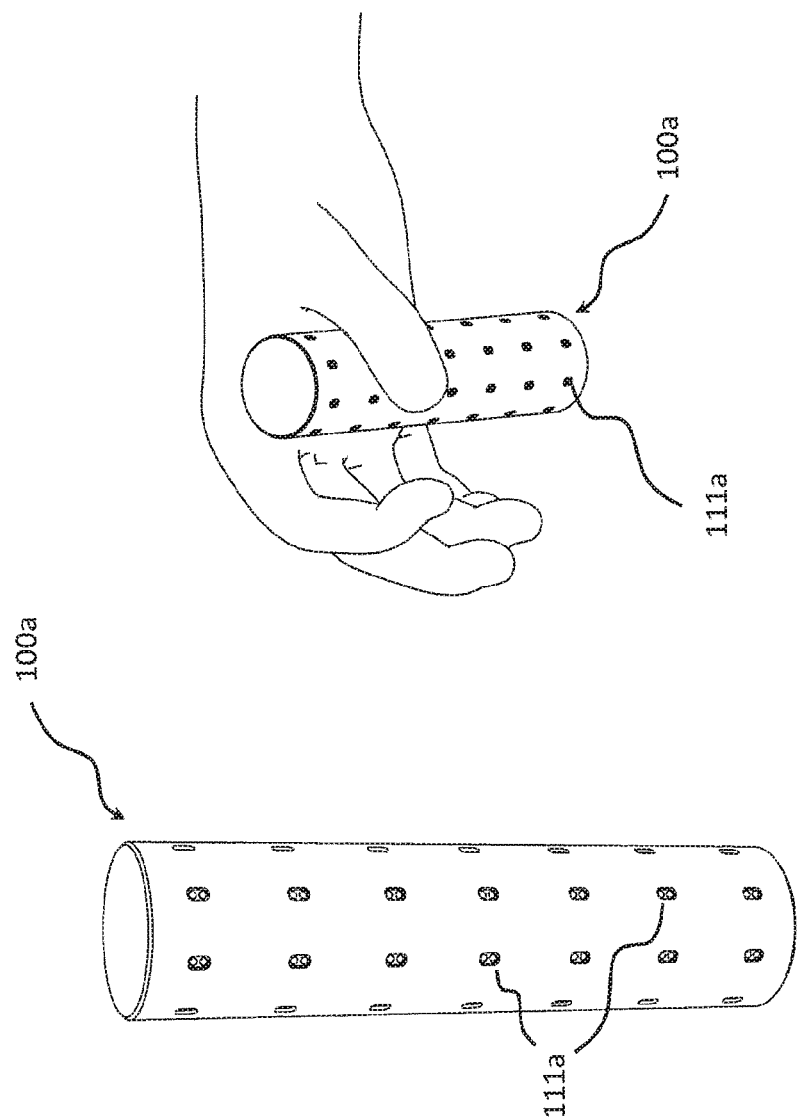

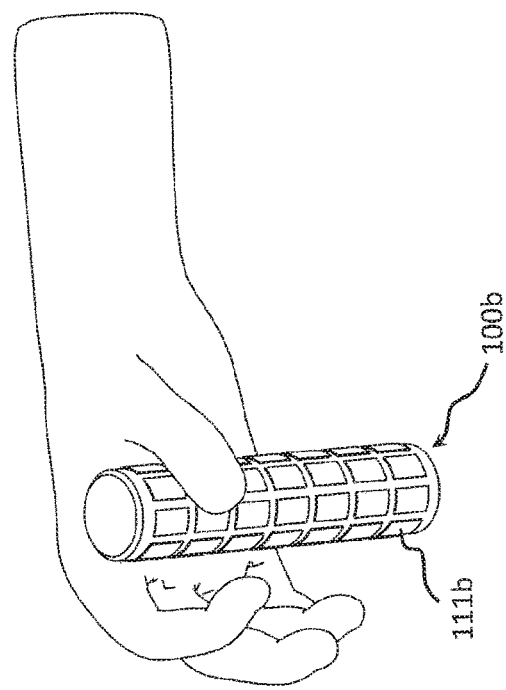
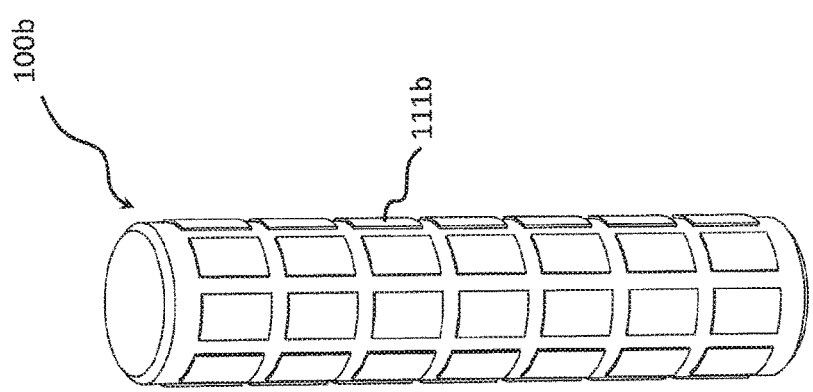
FIG. 5b
FIG. 5a

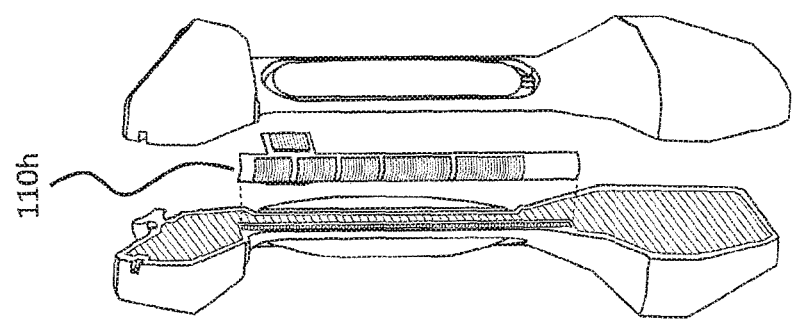
FIG. 9d
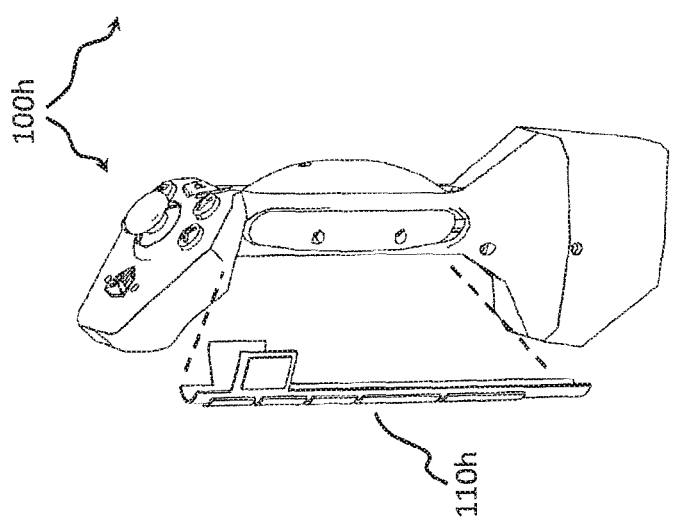
FIG. 9c
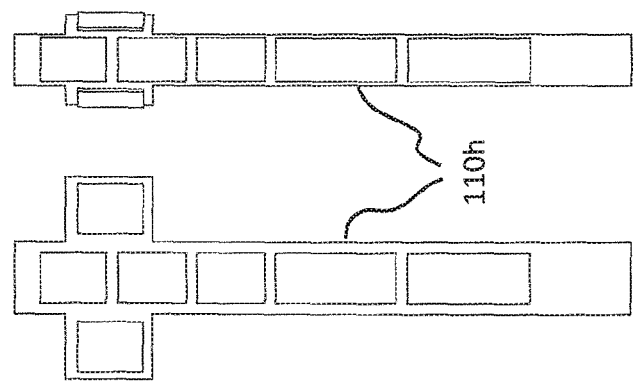
FIG. 9b
FIG. 9a

EMBEDDED GRASP SENSING DEVICES, SYSTEMS, AND METHODS

CROSS-REFERENCE TO RELATED APPLICATIONS

This application claims priority to PCT Application No. PCT/US2016/020112, filed Feb. 29, 2016, which claims the benefit of and priority to U.S. Provisional Application No. 62/126,608, filed Mar. 1, 2015. All of the aforementioned are incorporated herein by specific reference in their entirety.

BACKGROUND OF THE DISCLOSURE

1. The Field of the Invention

Generally, this disclosure relates to grasp or hand tracking devices or systems. More specifically, the present disclosure relates to sensing devices, systems, and methods for tracking the grasp state or pose of a user's hand or fingers for use in a remote (distant) or virtual environment (e.g., video games).

2. Background and Relevant Art

One of the most important aspects of interacting dexterously with teleoperated or virtual interfaces is the ability to measure a user's hand and finger movements (e.g., gestures or fine positioning of a user's fingers). Traditionally, "data gloves" (e.g., CyberGlove) have been used to measure hand movements and hand pose as an input to virtual reality (VR) or telerobotics systems. More recently, company's like Leap Motion are using depth cameras to measure the location, motion, and/or pose of a person's hand. Researchers have also used Microsoft's Kinect depth camera to track hand and limb motions.

BRIEF SUMMARY OF THE DISCLOSURE

Implementations of the present disclosure address one or more of the foregoing or other problems in the art with apparatuses, systems, and methods for measuring a person's hand pose, position, and motion.

In an implementation, a device may utilize a uniformly distributed array of sensors embedded in the device for measuring the presence and proximity of a person's hand and fingers. This array being capable of sensing the position of all of the person's fingers individually and/or other grasp state information (e.g., flexion/extension angle(s) for each finger which correlates to a person's grasp being open, closed, or somewhere in between). This same approach described above for sensing finger or hand positions can also be used for detecting the presence of a person's wrists, arms or other limbs.

The sensor or sensor array as referred to herein can utilize optical, capacitive, or other sensor technologies known in the art. These various sensor technologies shall be referred to herein simply as "sensor", "sensor element", "sense element", "sensor zone", "sense region", or similar, without limiting the description to any one single type of sensor technology.

In another implementation, a device includes a uniformly distributed array (i.e., an array with evenly spaced sense elements on, along and/or beneath the surface of the device) of optical emitter-detector pairs. The optical emitter-detector pairs measure the presence and/or proximity of a person's hand and/or fingers near a device. This measurement may be based on measuring the light reflected off of the user's fingers and/or hand (or gloved/covered fingers and/or hand) to the device's embedded light detectors and/or by sensing that the refection of light from emitter to detector has been blocked when the user's hand and/or fingers are in contact with the device and thus blocking the light from being detected. The emitters-detectors may utilize different wave lengths of light as appropriate, including infrared (IR) wavelengths. The light may be pulsed to differentiate it as a light source that is different from ambient light sources. Using IR light also may provide the advantage that it is not visible to humans. Utilizing optical and/or digital filter techniques may be used to isolate this (or other) wavelengths of light.

In another implementation, a device includes a uniformly distributed array (i.e., an array with evenly spaced sense elements with each sense element of approximately the same size on, along and/or beneath the surface of the device) of capacitive, electrostatic, and/or capaciflective (i.e., using a driven shield electrode to distort the electric field outward from the device surface to increase the possible sensing distance) sensors for measuring the presence and/or proximity of a person's hand and/or fingers near a device based on measuring the change of capacitance due to the proximity of a user's fingers and/or hand.

In another implementation, a device includes a non-uniform set or array (i.e., an array with spacing between sense elements that may vary from sensor to sensor and may vary by region on the device and be placed on, along and/or beneath the surface of the device) of sensors, that may be placed to correlate to the expected locations of a user's hand when holding and/or interacting with the sensorized device, due to the way a device is meant to be held or the way the user's hand is attached to the user's hand (e.g., input buttons, knobs, levers, joysticks, hand straps, finger grooves, and/or ergonomic features that guide the placement of the user's hand/fingers on the device may be used to guide a user to interact or hold the sensorized device in a specific way and/or at specific regions on the sensorized device). Sensor types for this implementation may include capacitive, optical, or other sensor technologies known in the art.

In another implementation, a device includes a non-uniform set or array of sensors placed sparsely (i.e., not covering the entire surface of device or not with a regular inter-sense-element spacing) at expected locations of a user's fingers (e.g., because the device must be held in a specific manner because the user must be able to reach specific input buttons, knobs, levers, joysticks without repositioning their hand, or because the device includes hand straps, finger grooves, and/or ergonomic features that guide the placement of the user's hand/fingers on the device may be used to guide a user to interact or hold the sensorized device in a specific way and/or at specific regions on the sensorized device) and/or hand in locations that have high correlations to known grasp states (e.g., using principal component analysis or other analytical or empirical methods). In one or more embodiments, this approach may allow for fewer sensors to be utilized to predict hand and/or finger grasp states and/or poses, for example, by placing sensors at locations that have high correlation to a specific finger's positions and/or low likelihood of confusion with the position of other fingers. Utilized sensor types can include capacitive, optical, or other sensor technologies known in the art.

In another implementation, the size of the sensor zones and/or size of capacitive sensor electrodes of the grasp sensor may be of different sizes to correlate to the importance of the finger it is meant to detect or the purpose the sensor is meant to be used. For example, the index finger, thumb, and middle finger have greater importance in object manipulation, so one can utilize smaller capacitive electrodes (or other sense regions) in locations that correlate to these fingers to provide greater positioning sensing resolution. In some implementations, larger capacitive electrodes could be used at the locations of the ring finger or little finger as these finger motions are often highly coupled (i.e., similar and move together) and less critical for manipulation. Larger sense regions (e.g., larger capacitive sense electrodes) may be used when less resolution is required for sensed hand and/or finger position. For example, if only whole-hand grasping is required for an application, a single or few larger sense regions (e.g., one could use a single large capacitive electrode (e.g., 5 mm wide and 10 cm long) the approximate length of a human hand width if just sensing a single open/closed grasp degree of freedom for the entire hand) can be used to provide a single measure of grasp state on a continuum from fully-open to fully-closed (e.g., it can sense when the grasp is fully closed around the device, which could be mapped to a grasp state of "1" once properly calibrated, and sense when the grasp is fully open, which could be mapped to a grasp state of "0" once properly calibrated, and by having the ability to continuously make proximity measurements in between these two states, mapped to values between 0 and 1). In another example a sensor or sensors could be placed specifically at a location near the index finger to sense the position of the index finger, which could be used, for example, as an analog "trigger" input for video games. In another example, a sensor or sensors could be placed near the location of the index finger and thumb to measure their individual and/or relative positions that may be used as an input to, for example, virtual reality and/or robotic applications for representing the state of a precision pinch grasp between the index finger and thumb. In yet another example, one or a few sensors could be used to sense the grasp state (open, closed or somewhere in between) of the rest of the hand, or other fingers could be sensed individually. These examples are not limiting examples as the same approach would work for isolating the position and movement of any part of the hand or fingers.

In another implementation, the device that the grasp sensor is embedded in is a game controller or motion controller.

In another implementation, the grasp sensor is embedded in the handle of a game controller or motion controller.

In another implementation, the device with embedded grasp sensing is cylindrical shaped.

In another implementation, the device with embedded grasp sensing includes an orienting feature to help suggest, constrain, limit, or determine how the device is held. The orienting feature could be a label, geometric feature, shape of device that ergonomically matches human anatomy, or other methods. Such an orienting feature can help reduce the number of sensors required to measure finger positions.

In another implementation, the device with embedded grasp sensing provides a "click-like" tactile feedback and/or sound when used in combination with embedded hand or finger position sensing. This tactile feedback can be used as a means for the device to inform the user and/or acknowledge that they have moved their finger to a given location. The sensed finger location that is sensed and/or acknowledged could be when contact is made with the device (e.g., when mimicking pulling the trigger of a gun) and/or some position that is outward from the surface of the device (e.g., pointing a finger outwards from the device). This tactile feedback could be provided through vibration and/or other means for providing tactile feedback and/or could utilize a mechanical structure that moves and/or buckles in a manner similar to the feeling of a mechanical switch.

In another implementation, the grasp sensor signal continues to be affected (changes) after the user's finger is touching the device (i.e., after his/her grasp is closed around the device). While prior to contact this changing signal can be used to predict the distance each part of a finger or hand is away from the sensor, after contact with the device is made, the changing sensor signal can be correlated as a prediction and/or estimate of grasp force. For the example of capacitive sensing, the capacitive sensor signal increases as the user's finger nears the device and after contact is made this sensor signal continues to increase, which can indicate increasing grasp force.

In another implementation, the location of the user's hand relative to the device with embedded grasp sensing may be determined by having the user fully or partially grasp the device or attaching the device to the user's hand through straps, slings, sleeves, etc.

In another implementation, a method for measuring and improving the reliability of grasp state measurements through the combination of sensor measurements at different locations is presented. For example, it may be difficult to determine whether a change in sensor signal is due to the motion of the user's index finger or thumb. However, by also including a sensor measurement in a neighboring location, identifying the finger that caused the change in sensor signal becomes significantly more predictable.

In yet another implementation, a method for distinguishing which hand a device is held in is described that is based on the combination of sensor measurements at different locations. For example, this method can include placement of a pair of sensors such that they correlate to the unique location of the right or left palm of the users when the device is held with the left or right hand, where the opposite sensor in this pair would have a variable signal associated with the user's thumb position.

Additional features and advantages of exemplary implementations of the disclosure will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings, one or more of which may be drawn to scale. For better understanding, like elements have been designated with like reference numbers throughout the various accompanying figures. Understanding that these drawings depict only typical embodiments of the invention and are not therefore to be considered to be limiting of its scope, the invention will be described and explained with additional specificity and detail through the use of the accompanying drawings in which:

FIG. 3a is a cylindrical device with embedded grasp sensing via an array of uniformly distributed optical emitter-detector pairs;

FIG. 3b is a grasped cylindrical device with embedded grasp sensing via an array of optical emitter-detector pairs;

FIG. 5a is a cylindrical device with embedded grasp sensing via an array of uniformly distributed capacitive sensors;

FIG. 5b is a grasped cylindrical device with embedded grasp sensing via an array of capacitive sensors;

FIG. 9a shows the 7-sensor capacitive array sensor or FIG. 8e as a flat flex circuit;

FIG. 9b shows the grasp sensor of FIG. 9a folded and/or bent to follow the contour of the device it is to be embedded within;

FIG. 9c shows the 7-sensor capacitive array grasp sensor of FIGS. 9a and 9b relative to the front of the device it is to be embedded in;

FIG. 9d shows how the capacitive grasp sensor flex circuit of FIGS. 9a-9c could be placed within the device, under the device surface;

DETAILED DESCRIPTION

One or more implementations of the present disclosure relate to grasp and hand position sensing. It may be advantageous to know a person's hand and/or finger position relative to a device for many purposes. Among these purposes is the use as an input to a computing system or as a means of understanding how users interact with the device 100. In particular, implementations of the present disclosure relate to the sensing of grasp states of a human hand for use in virtual reality, telerobotics, video games, ergonomic hand placement and motion studies, rehabilitation, etc. 101, as portrayed in FIG. 1.

For example, tracked hand/finger positions can be used more generally as a user input (e.g., in a manner similar to how touch screens are used on a computer, tablet, or smart phone, or how hand gestures can be used as a natural user interface to computer systems (e.g., as shown in the movies "Minority Report" or "Iron Man"). In contrast to touch screens, an important part of the grasp sensing described herein is prior to contact with the device.

At least one embodiment of the present approach utilizes sensors embedded within a device that is held by a person or attached to a person's hand (e.g., with a strap or harness) to measure the position, pose, motion, or combination thereof of the person's fingers. This creates the ability to represent their hand motions in virtual reality, robotic, video game and other applications, while still holding or having an apparatus available to also record user input via analog joysticks or triggers, or digital buttons.

Figure 2A:
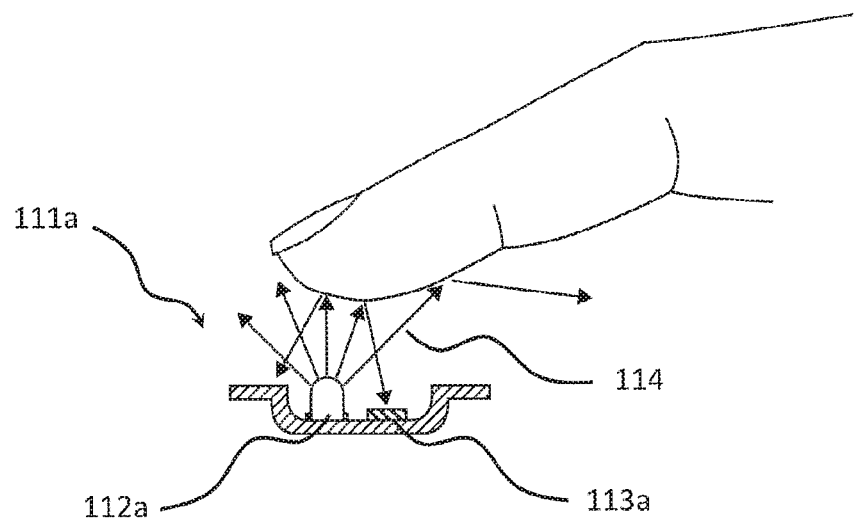
FIG. 2a is a schematic diagram depicting an optical emitter-detector sensor for sensing the proximity and/or location of a person's finger or hand relative to the sensor and device.
Figure 2B:
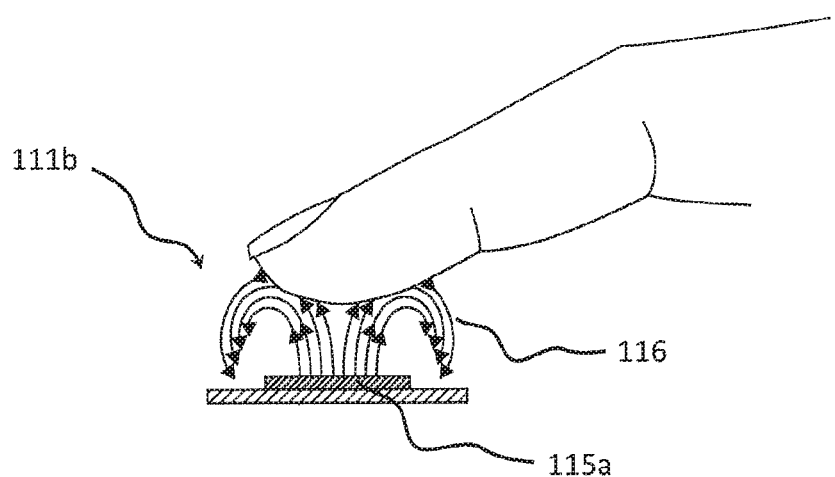
FIG. 2b is a schematic diagram depicting a capacitive sensor for sensing the proximity and/or location of a person's finger or hand relative to the sensor and device.

The most promising approaches of sensorizing a device with sensors contained in the body of the device for determining the position of a user's hand(s), with respect to that device, is to place an array of sensors at or just beneath the surface of the device. These sensors could be optical 111a (e.g., emitter-detector pair), capacitive 111b (e.g., capaciflector and/or electrostatic sensor), or some other sensor type known in the art. Optical proximity sensors 111a, based on emitter-detector 112a-113a pairs could be used to sense the relative distance from that particular location of the device via reflected light 114, as portrayed in FIG. 2a. Capacitive proximity sensors 111b could also be used to detect the presence and distance to a user's hand near capacitive sense elements or sense electrodes 115a through the interaction of the user's hand with the generated electric field 116, as portrayed in FIG. 2b. A specialized version of capacitive sensing called a capaciflector that utilizes a driven shield can also be used to increase the sensing distance from the device's surface.

Figure 4:
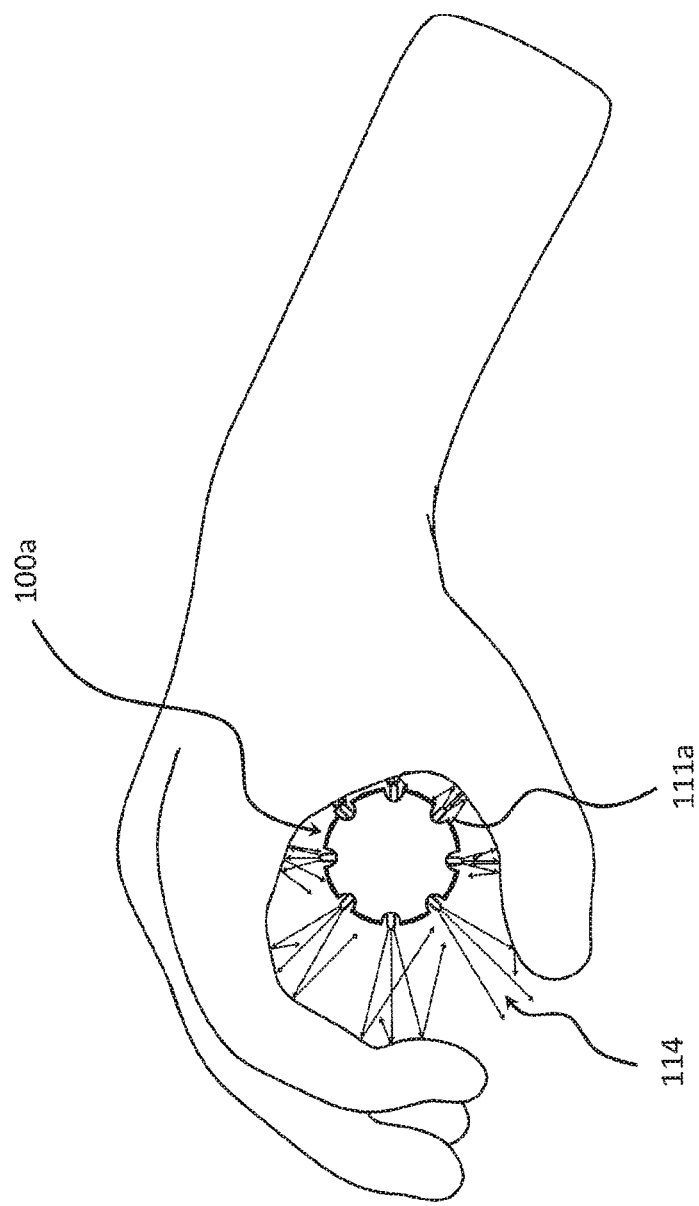
FIG. 4 depicts the reflection of light from the emitters to the detectors for sensing the location of a person's fingers.

The emitter-detector sensor array on the instrumented device 100a can be accomplished by placing the sensor elements within the structure and wiring to the individual sensor locations or by placing the sensors on a rigid or flexible printed circuit board (PCB), or could utilize conductive cloth, textiles, or composite materials. FIG. 3a shows a cylindrical device or handle 100a that has a uniformly distributed array of optical emitter-detector pairs 111a placed on its surface. The optical sensors can also be covered by cloth or material that is transparent to the wavelength of light that the emitter and detector are tuned to (e.g., infrared light also known as IR light). FIG. 3b shows the sensorized device 100a of FIG. 3b being held. Multiple sensor measurements could be correlated to predict the position and grasp state of each finger (e.g., using principal component analysis). FIG. 4 portrays a "ray trace" of the light 114 reflected from the emitters to optical detectors (which combine to form optical proximity sensors 111a) within the device 100a, where the closer a user's hand is to the device, the more light is reflected into the detector. Light from one emitter-detector can be reflected and detected by neighboring detectors resulting in "cross-talk." Reducing the effective field of view of the emitter-detector pairs reduces cross-talk, but can also increase the number of required emitter-detector sensors, so, in some embodiments, it may be desirable to create device designs that include varying sensor spacing and sensor field of view.

Figure 6:
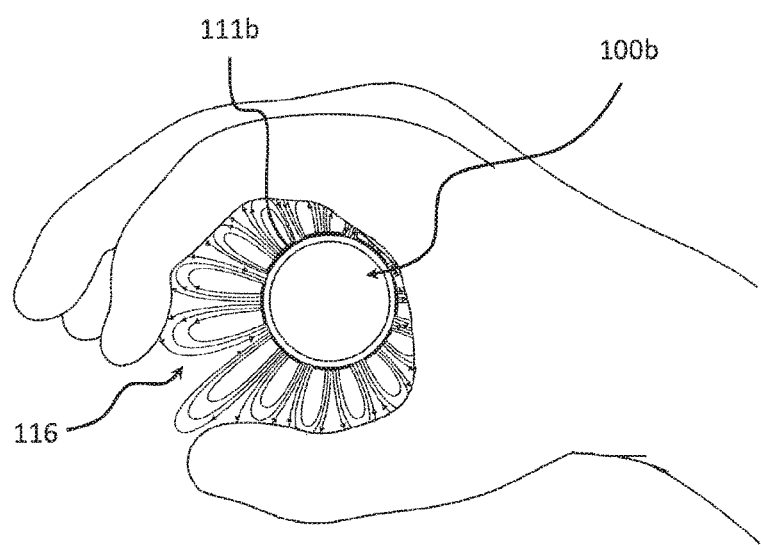
FIG. 6 depicts the change in the electrical field lines in the presence of a human hand for sensing the location of a person's fingers.

The capacitive sensor array can be accomplished by placing conductive zones inside and/or on the outside surface of the device to act as sense electrodes, which could be done by a spray coating or deposition technique or via a mask, stencil, stamp, sticker, decal, or other techniques. The sense electrodes could also be arranged by placing the sense electrodes on a rigid or flexible PCB inside the device. FIG. 5a shows a cylindrical device or handle 100b that has a uniformly distributed array of capacitive sensing electrodes or elements 111b placed on its surface. The capacitive sensors can be placed below the surface of the device. If the housing is not made of a metallic material it may interfere with the capacitive sensor's electric field. FIG. 5b shows the sensorized device 100b of FIG. 5a being held. Multiple sensor measurements could be correlated to predict the position and grasp state of each finger (e.g., using principal component analysis). FIG. 6 portrays a visualizing of the electric field lines 116 near each capacitive sense element 111b, where the closer a user's hand is to the device 100b, the greater the sensor value, since the dielectric constant of the human hand is similar to that of water, which is approximately twice that of air (Capacitance C follows the relationship, $C=\in A/d$, where $\in$ is the dielectric constant, A is the area of the capacitive electrode and d is the distance between the electrodes). One can utilize commercially available capacitive sensing chips for this purpose, e.g., an Analog Devices AD7147. AD7147-1, or Cypress CY8C24894.

The spacing of the proximity sensing elements (optical, capacitive, etc.) can be chosen based on the required spatial resolution along the surface of the device and/or can be arranged in a non-uniform pattern based on pre-knowledge of a user's hand placement and/or based on using experimental measurements and optimal estimate (e.g., based on principal component analysis for the placement of sensor elements).

An example of a general procedure for determining the best distribution and effective size of sensing elements is to start with the device to be sensorized and begin with an array of sensing elements with a uniform between-sensor spacing smaller than the effective spatial resolution (along the surface of the handle) desired (e.g., adult human fingers are approximately 5-10 mm wide, so a sensor spacing of 5 mm or less may be a desirable starting point). One would then capture sensor data from this sensor array from a collection of users with a wide range of hand sizes while these users open and close their grasp on the handle of the device, while also capturing the actual finger positions with a high-quality motion capture system (e.g., using multiple optical cameras) so that the actual finger locations are measured and known and that this high-quality finger-tracking data can be used as a "truth model" in the mathematical formulation when determining the optimal sensor layout (e.g., least squares techniques, principal component analysis, etc.). Specific finger positions and/or grasp states (e.g., completely open grasp with fingers fully extended and/or completely closed grasp with fingers closed around the device or some relative state or finger positions in between) can be identified and used to weight the mathematical solution to better ensure accurate finger pose estimation for these specific finger poses and grasp states, while solving for which sensor locations best contribute to providing the best estimate of finger states. Once this process has been completed for the initial finely/densely, uniformly spaced array, one can use the result of the above analysis to provide an optimal distribution of sensors of that size and spacing and remove the sensor elements from the surface (inside, within, or outside of device surface) at the locations along the surface that did not significantly contribute to the finger pose/grasp state predictions (i.e., the locations where proximity sensor signals were not changing significantly, which likely correlate to areas where the user is either always in contact with the device like the palm, or to areas outside of where the user makes contact with the controller).

Once this process has been completed for the initial more finely/densely spaced array, one can then consider changing the effective sensing area/range of the sensing element (i.e., for emitter detector the cone angle of the emitter-detector along which light can be transmitted out and reflected back within, which can be varied by changing the depth beneath the device surface and/or altering geometric packaging, etc.). A narrower field of view is advantageous as it reduces sensor cross-talk as inferred in FIG. 4. But and narrower field of view for emitter-detectors can also require more sensors, which adds cost. For capacitive (i.e., general capacitive, electrostatic, and capaciflective sensor types) and similar proximity sensors changing the size of the sense electrode also changes the effective radial range of the sensor, so it may be desirable to increase the size of the sense electrodes so that the user's fingers can be tracked at greater distances from the controller. Increasing the size of the capacitive sense electrode increases the effective sensor range to be able to sense the presence of a finger at greater distances and also provides a larger total signal at all relative finger distances). Hence, to reduce the total number of sense elements required (i.e., also reduces system complexity and cost) utilizing sense elements with larger effective sense areas (i.e., larger cone angle for optical emitter-detector sensors and larger sense electrode for capacitive sensors) can then be considered in a second iteration of the sensor array design using the sensor placement from the above more finely spaced array and same optimization techniques (e.g., least squares, principal component analysis, etc.). This can lead to a further reduction in the total number of sense elements required to accurately predict hand/finger position/pose information. In areas that multiple fingers occupy a similar or overlapping space, it can be advantageous to utilize a combination of smaller and larger area detecting sensors (e.g., see the combination of sense element sizes used in FIG. 8e).

At least one embodiment utilizing the capacitive sensing approach described herein may provide the advantage over an optical emitter-detector design in that the capacitive sensing elements can be placed inside the device, which protects the sensing elements against wear and/or makes them not susceptible to the accumulation of dirt which is common on hand-held devices. That is, one or more embodiments of a capacitive sensing approach may be almost completely insensitive to the accumulation of normal amounts of dirt on the surface of the device from handling a device. Whereas an optical emitter-detector sensor relies on the transmission of light and accumulated dirt, even if the emitter-detector is placed under a light-transparent covering rather than being exposed, can impede the transmission of light and hence also affect the optical sensor performance.

One or more embodiments of a capacitive sensing approach may provide the advantage over one or more embodiments of an optical emitter-detector approach in that the capacitive sense electrodes can be placed within the body of the device as opposed to needing to be at the surface of the device as one or more embodiments of an emitter-detector optical sensors require, or without the complexity of adding fiber-optics for the transmission of light to and from the emitter and detector as would be required if the optical emitter-detector pair wasn't located near the surface of the device.

One or more embodiments utilizing capacitive grasp sensing may provide the advantage that the capacitive sensors could also infer the user's grasp force on the device. That is, the sensor signal continues to change after the user makes contact with the device, which could be enhanced if the device is deformable. This information could be useful as an additional input into the computing system or used as a control signal.

Figure 7D:
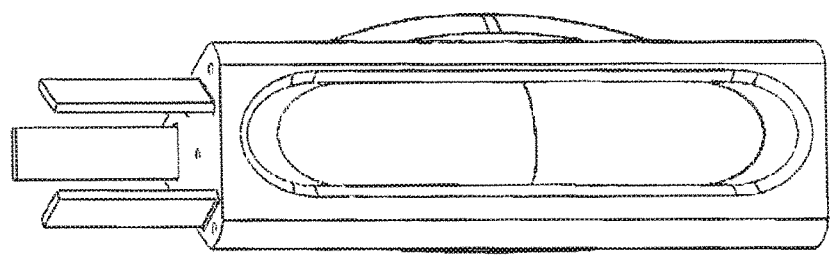
FIG. 7d shows the linear capacitive sense arrays of 7c placed into a device for the purpose of sensing hand position.
Figure 7C:
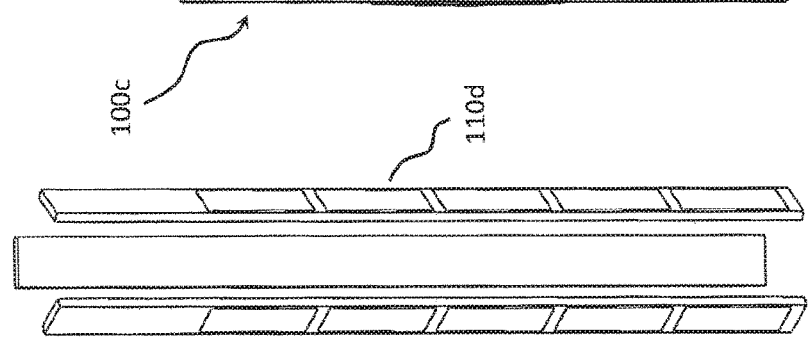
FIG. 7c shows a collection of multiple linear capacitive sense electrode arrays, e.g., as shown in FIG. 7a or 7b, placed in a radial or circular pattern to form a grasp sensing array.
Figure 7B:
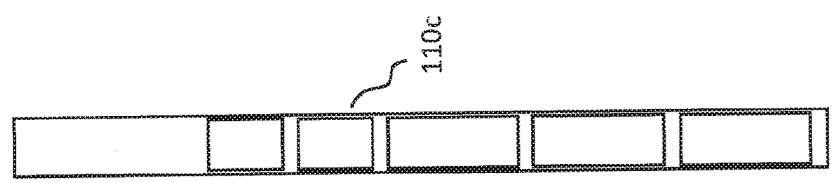
FIG. 7b shows an example of a linear array of capacitive sense electrodes whose spacing is non-uniform.
Figure 7A:
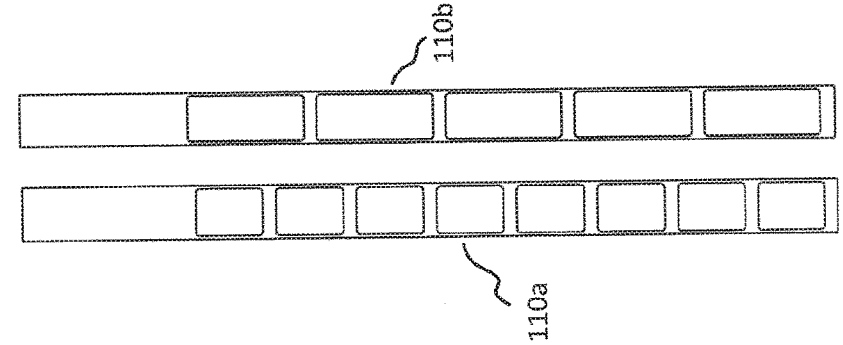
FIG. 7a shows linear arrays of uniformly distributed capacitive sense electrodes with two different electrode densities.

FIGS. 7a-7d portray possible embodiments for a device or device handle where an array of capacitive sensing elements are arranged in three linear strips of sensors. These linear arrays can be placed radially opposed to each other within the handle of the device, or in the example shown in FIG. 7d these three linear arrays are placed facing radially outward at the corners of a triangular handle. As shown in FIG. 7a, the linear arrays 110a and 110b can be uniformly distributed and have as many electrodes as desired. However, the minimum number of electrodes is determined by the number of degrees of freedom one wishes to sense for the user's hand. FIG. 7b portrays a non-uniform linear array 110c where smaller capacitive sense electrodes are used in the region that corresponds to an area of the handle where greater spatial resolution is desired. Note that increasing the size of the capacitive sense elements increases the magnitude of the measured signal, and increases the radial distance the electrical field lines project and hence increases the distance from each sensor it can sense the presence or proximity of objects. However, increasing the size of sense elements also reduces the spatial resolution tangential to the sensorized device surface, so, in some embodiments, it may be desirable to create device designs that includes a combination of sizes of sense elements and sense element spacing. FIG. 7c shows the arrangement of the linear sensor arrays 110d as they are inserted into the handle of FIG. 7d. Note that the capacitive sense electrodes are pointed radially outward, with their associated ground planes placed on the opposite side of these boards, radially inward.

Figure 8A:
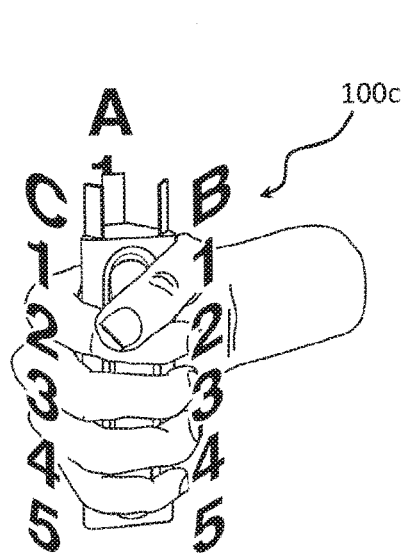
FIG. 8a shows the device of FIG. 7d grasped by a hand and with a 5-sensor linear capacitive array placed at locations A, B, and C at the corners of a triangular handle for the purposes of sensing finger position.
Figure 8B:
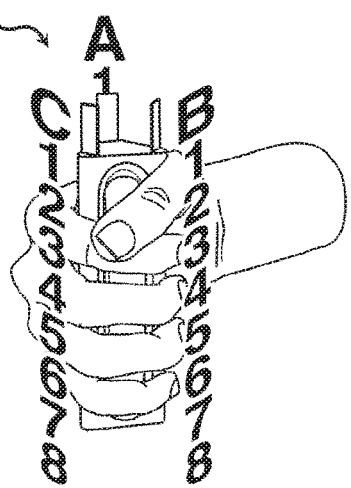
FIG. 8b shows the device of FIG. 7d grasped by a hand and with an 8-sensor linear capacitive array placed at locations A, B, and C at the corners of a triangular handle for the purposes of sensing finger position.
Figure 8C:
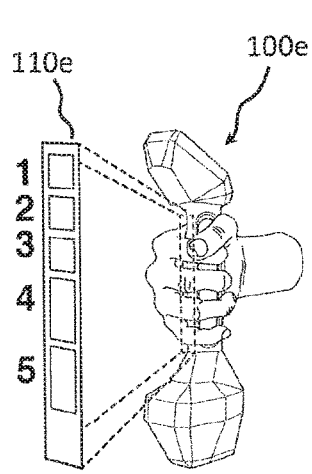
FIG. 8c shows the device handle with the non-uniform 5-sensor linear capacitive array of FIG. 7b placed inside and at the front of the device handle or equivalent of location C of FIGS. 8a and 8b.

FIGS. 8a and 8b portray the sensorized device handle 100c and 100d of FIG. 7d, but with the 5- and 8-sensor boards from FIG. 7a placed within the handle. It was found empirically that the best location among locations A, B, and C for sensor board placement (if one were to only choose one of these relative locations on the handle of a device) as shown in FIGS. 8a and 8b is at the front, as this location produces monotonically increasing sensor output as a user closes their grasp around the handle. Location A, for right-hand use has very little change in signal as a user opens and closes their grasp. Location B, for right-hand use, provides information about the potion on the user's thumb, however, only the sense elements near the top of the handle are useful for this purpose. Hence, FIGS. 8c, 8d, and 8e portray possible device embodiments where a sensor array is placed at the front of the device handle and two additional electrodes are placed neighboring the linear array in FIG. 8e, for the purposes of detecting which hand the user is holding the device in because the associated sense element R2 or L2 will saturate on the side associated with the hand that is holding the device. The side electrodes R2 and L2 can also be used in combination with signals from the linear array for improving the estimate of thumb position relative to the handle (i.e., changes in sense element 3 (or 1) that correlate with sense element R2 or L2 are likely associated with the thumb). Sense elements at locations R2 and L2 may facilitate distinguishing index finger from thumb motions (by detecting varying proximity signals on the side of the handle where the thumb is present) and determine which hand the device is held in (by detecting proximity signals that are nearly constant and indicate the close proximity with the user's palm on the associated side of the device). The distribution of sense elements shown in FIG. 8e is attractive as it can be fabricated in a single consolidated location. However, as an example, one could also utilize the sensor distribution shown in FIG. 8c in combination with sense elements at device's side locations A and/or B (see where locations A and B are in FIGS. 8a and 8b) as separate sensor circuit boards or fabricated as a folded flexible printed circuit and placed within the device.

As observed above, having a designated device orientation may allow for a reduction in the number of sense elements required to estimate the user's hand position. The device hand orientation may also be controlled by use of a hand attachment to the device and/or an ergonomic device shape that increases the likelihood of a user holding a device in a given manner. One example includes the use of finger grooves in the handle of the device to guide the user's hand to a specific location and/or grasp of the device. Another example of this includes having surfaces on the device for a user to register their hand against, as is the case with the horizontal surface at the top of the handle that the user can rest their hand against in FIGS. 8c-8e. Such a feature may make it significantly easier to arrange a sensor array relative to this location and/or may allow sensing to be more robust to variations in hand sizes. In the case where the motion of the thumb, index finger, and ring finger are the most important to sense the location of, placing a rest at the top of the device may permit smaller sense electrodes to be placed near the top of the device with high confidence that the sense electrodes will lie under these three fingers and hence the signals recorded by these top sense electrodes will highly correlate to the position of the respective finger relative to the handle. The side electrodes as shown in FIG. 8e can be combined with the sensor readings of the second electrode R2 or L2 to predict the thumb's position. Since the motions of the middle, ring, and little finger tend to be less important for measuring as an input for virtual and/or telerobotic manipulation, larger sense electrodes can be used lower in the handle in the locations corresponding to these fingers (see FIGS. 8c and 8e). Furthermore, since variations in hand size have the greatest effect on the location of the fingers lowest on the handle (assuming the user's hand is butted against the top of the cylindrical handle), it is also appropriate that these finger positions are sensed by sense elements that overlap the associated finger for a large range of hand sizes (as shown in FIGS. 8c and 8e).

FIG. 9a shows the same 7-sensor capacitive array as in FIG. 8e. FIG. 9b shows this sensor array as a flex-circuit that is bent to follow the contour of the handle of the device, which may allow the capacitive sensor array to be placed on a single flexible circuit and/or may allow the sensor array to be placed as close as possible to the surface of the device to maximize radial sensing range. FIGS. 9c and 9d show a possible placement of the 7-sensor array of FIG. 9b within the handle of a device. Using a sensor configuration shown in FIG. 8e or 9a-9d and utilizing the side electrodes to augment the thumb position measurement is advantageous, while still maintaining a simple sensor design. That is while one can map individual sensors to the position of an individual finger. One can also use a second or additional sensors to increase the accuracy of the position estimate of that finger and/or to increase the likelihood that the estimate is for a particular finger (e.g., this can be done by adding a sensor to the left or right of a linear array in the front of the device or cylindrical handle, to deduce whether the signal change is due to the index finger or thumb, which overlap when closing one's hand around a cylindrical handle).

In one or more embodiments, an ergonomic feature may be used to rest against (e.g., be positioned adjacent a sensor) a user's hand to be located against a groove, stop, and/or bolster to allow one of the finger locations to be "known" and allow sensor configurations that more easily accommodate different hand sizes. In one aspect, this ergonomic feature is a finger-groove at the top of the device's handle in which the user's thumb and/or index finger can rest. Such a feature positions the user's hand at the top of the handle such that proximity sensing elements can be co-located at the location of this ergonomic feature (e.g., under the surfaces of the plastic casing of the device). As the most useful and common hand motions are by the user's thumb, middle and index fingers registering the user's index finger and thumb to a known location (e.g., having them rest in a finger groove or against a bolster) can be advantageous as it can ensure that the proximity sensors are co-located in this area, regardless of hand size. This ensures good measurement and estimation of the finger proximity at the thumb, index, and middle fingers. As people rarely move their ring and little fingers independently, having poorer co-location of the ring and little finger is of less importance, as a simplified kinematic hand model that couples the predicted position/ pose of these fingers can be utilized (i.e., move the ring and little fingers together as if taped together or in a mitten). The remaining device proximity array sensors can be positioned relative to these ergonomic features and if the proximity sensors farthest from these ergonomic features do not register the presence of a finger, this knowledge can be used to infer the user has a small hand size and the mapping of the finger motions can be adjusted to be driven off of the sensors located closer to the ergonomic feature.

Figure 10C:
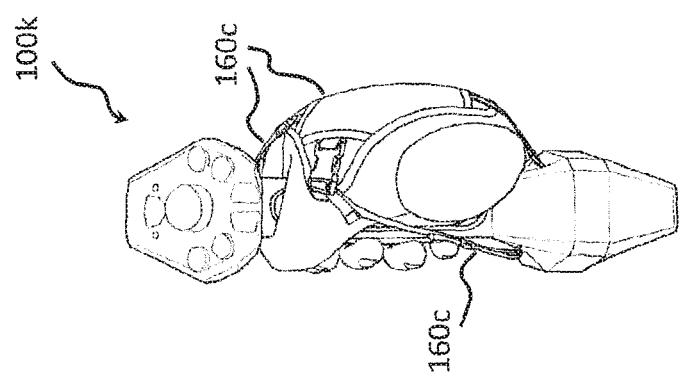
FIGS. 10a-10c show possible hand strap configurations for attaching a user's hand to a device.
Figure 10B:
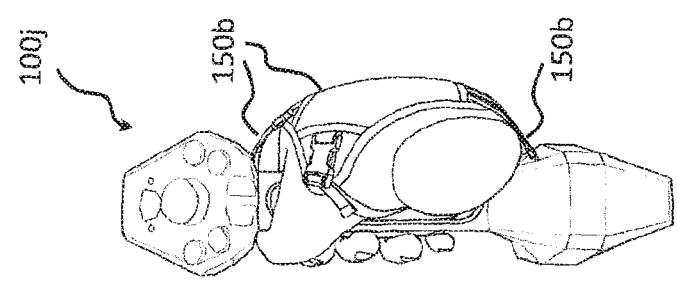
Figure 10A:
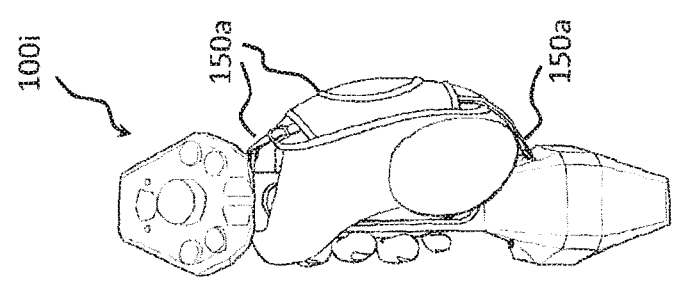

In addition to geometric features of the device for registering a user's hand against, connecting the user's hand to the device may also help simplify grasp sensing and/or may reduce the number of sensors necessary to sensor the user's hand motions. The hand strap configurations shown schematically in FIGS. 10a-10c that represent some possible embodiments for connecting or attaching the user's hand to a sensorized device, which may facilitate placement of the user's hand in a known location on the handle of the device, which can significantly simplify the algorithm for predicting finger location/grasp stated by constraining the possible solutions (i.e., the user's hand is known to be strapped to and touching the device at a given region of the device, whose sensor value can then be correlated as the user touching this location).

Figure 8D:
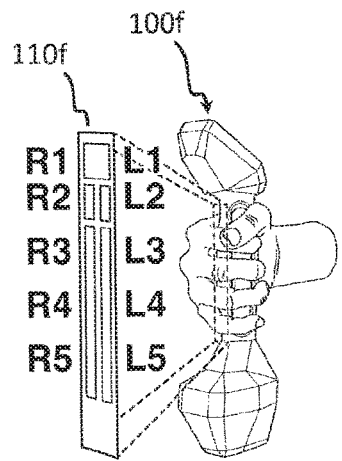
FIG. 8d shows the device handle with a non-uniform 5-sensor capacitive array placed inside and at the front of the device.
Figure 8E:
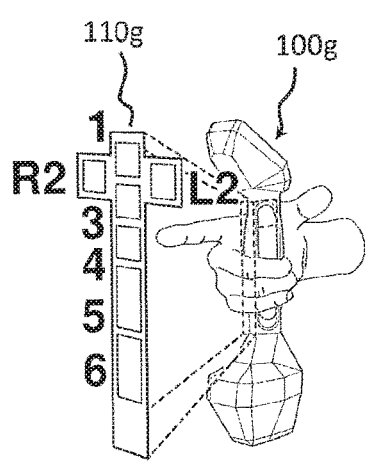
FIG. 8e shows the device handle with a non-uniform 7-sensor capacitive array, which is based on the design shown in FIG. 8c, placed inside and at the front of the device handle with additional sense elements placed at locations R2 and L2.
Figure 11A:
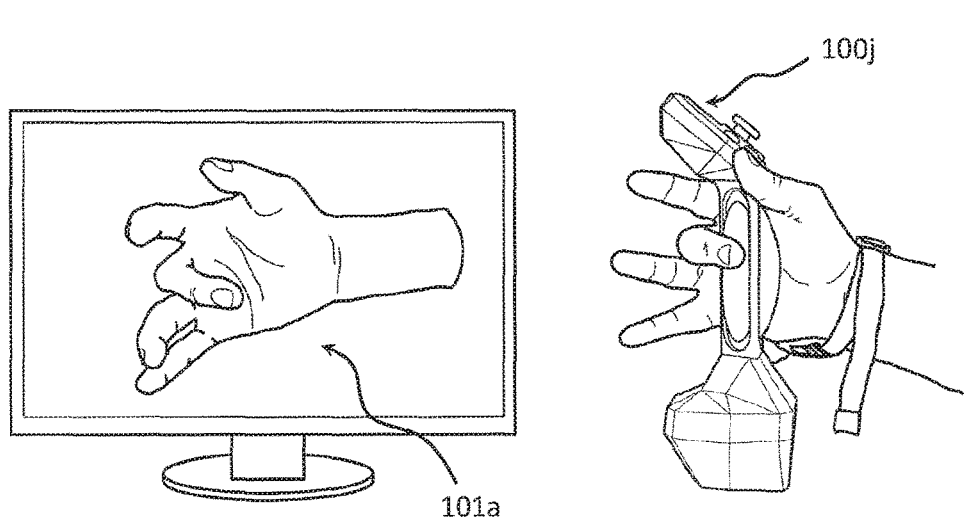
FIG. 11a shows the sensed position of the user's middle finger (e.g., using the sensor array depicted in FIGS. 8e and 9d.
Figure 11B:
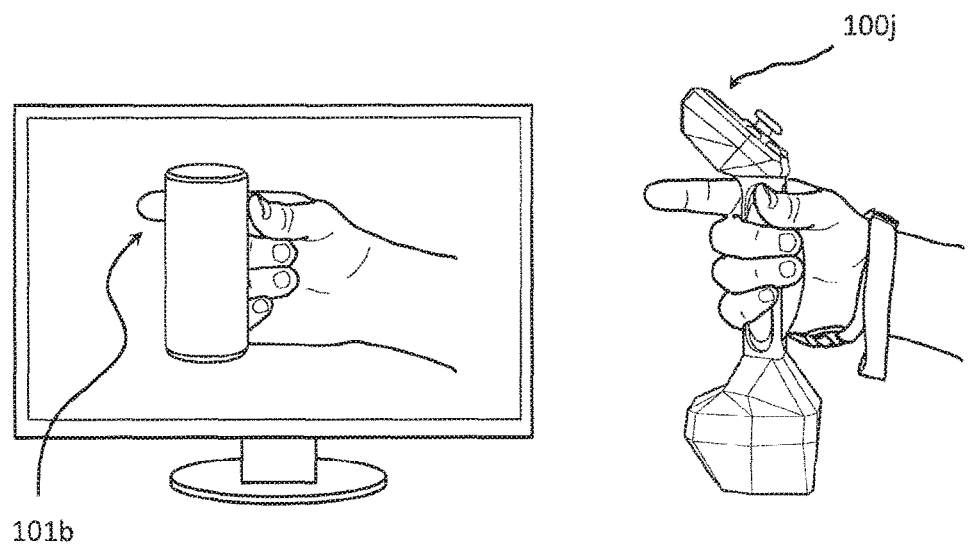
FIG. 11b shows the sensed pinch grasp of the user's index finger and thumb and associated calculated position of a hand model on the computer screen relative to the sensed handle position, used to grasp a virtual object in a precision, pinch grasp.

FIGS. 11a and 11b portray one possible means of mapping the sensor readings from a sensor array placed at the front of the controller, as shown in FIGS. 8c-8e. In one embodiment, the proximity measurement of sensor 1 in 8e could correlate to the index finger's open/closed grasp state, sensor R2 could correlate to the device being held in the right hand and sensors L2 & 3 could correlate to the relative open/closed grasp state of the user's thumb, with sensor 3 to providing redundant thumb sensing with sensor L2. Sensor 4 could correlate to the grasp state of the middle finger, sensor 5 could correlate to the grasp state of the ring finger, and sensor 6 could correlate to the position of the little finger. Multiple sensor measurements could be correlated to predict the position and grasp state of each finger and associated calculated position of a hand model on the computer screen. In this simple approach, for the sensor array shown in FIGS. 8e, 9c, and 9d, the sensor output range of each sense electrode is measured and the range of each sensor is recorded and tared (zeroed), where sense element 1 at the top of the handle is assigned to the index finger's relative position, sense elements 2 (R2 or L2) and 3 are associated with the thumb's position, sense element 4 is associated with the middle finger, sense element 5 is associated with the ring finger, and sensor value from sense element 6 is associated with the little finger. These sensor values may then be used at the input where the measured sensor range for each sensor is normalized and used as an input to a kinematic hand model where a value of 0 maps to that finger being fully extended (open grasp) and a value of 1 is mapped to that finger being closed or grasping the handle. Hence as the sensor value changes for each of the sense elements, the hand model on the computer moves the finger associated with each of the sensor measurements. This approach assigns a single sensor measurement to the grasp state of an individual simulated finger, with the motion of all joints of that finger moved in a proportional manner as a function of the single sensor measurement. More complex models are also possible which could utilize higher density of sensors and/or sensors placed at more than just the front of the device (e.g., as shown in FIGS. 3a, 3b, 5a, 5b, 7a-7d, 8a, and 8b).

Nominal values for the sensor zero value (open grasp) and sensor range would be stored in the device firmware or device drivers on the associated computer system (e.g., personal computer, smart phone, Internet of Things device, or computer system), and the device firmware and/or computer drivers would self-calibrate when a hand of a sufficiently different sensor array signature became present and/ or when the device was no longer grasped. While held continuously, which can be determined by the sustained sensor reading at sensor R2 when held in the right hand or sensor L2 when held in the left hand, only small adjustments to the range and zero values would be made by the firmware or device drivers so as to ensure that a fully open and fully closed grasp configuration is recognized. The allowed "zero" and "full range" (i.e., the value of the maximum/ closed grasp to minimum/open grasp sensor value) values of the sensor would have hard limits set to ensure nominal functionality across a wide range of hand sizes. When small hands are sensed, for the sensor configuration shown in FIG.

8e, sensor 6 would measure little or no signal, which would adjust the finger mapping up by one, such that sensor 6 would then correlate to the little finger, sensor 4 for the ring finger, and sensor 3 for the middle finger.

FIG. 11a shows the above described approach is capable of driving the middle finger motion of the simulated hand model driven by sensor 4 as shown in FIG. 8e. FIG. 11b also shows the capability of measuring the index and thumb motions for a pinch grasp. Finger tracking can utilize an array of proximity sensors (e.g., as shown in FIG. 3b, 5b, 8c-e, or 9a-d) and suitable mathematical calibration/correlation (e.g., utilizing principal component analysis). In one implementation, foreknowledge that the user intends to utilize a pinch grasp could permit the relative opening of the pinch grasp to be determined by a smaller set of proximity sensors (e.g., with sensor elements located at positions 1, L2, and 3 in FIG. 8e, where the sensed value of sensor 1 could correlate to the position of the index finger of the right hand and sensed readings of sensors L2 and/or 3 could correlate to the position of the thumb).

Figure 11C:
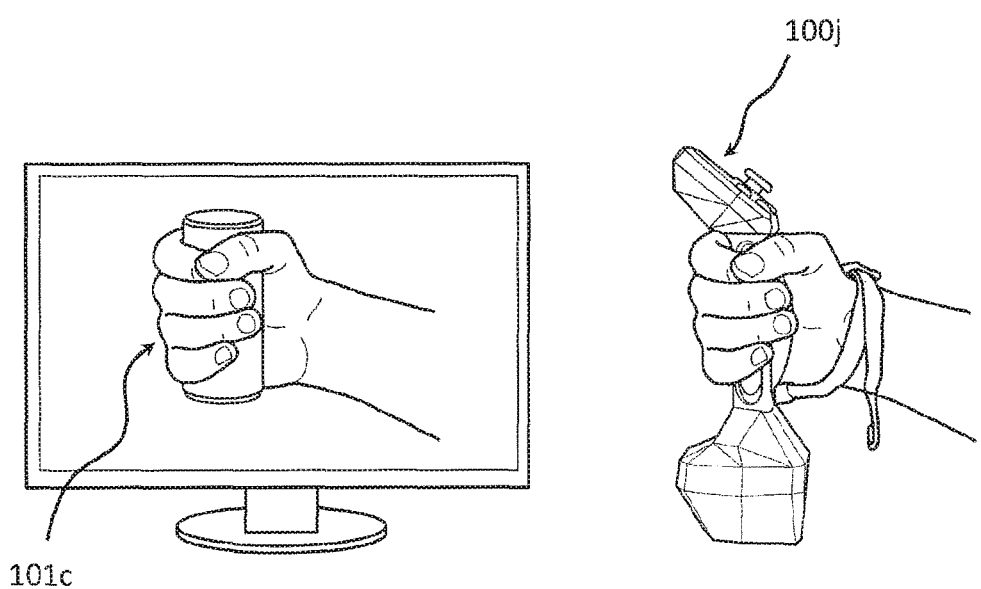
FIG. 11c shows the sensed whole-hand grasp of the user's hand and associated calculated position of a hand model on the computer screen relative to the sensed handle position, used to grasp a virtual object with a whole-hand grasp.

Note that it is also possible to use specialized methods for controlling the motions of the simulated hand model (or to be used to control a telerobotic grasper). For example, if only a single whole-hand grasp is necessary, as shown in FIG. 11c, then one can simply use the average of the normalized sensor measurements as one possible sensing approach. Finger tracking can utilize an array of proximity sensors (e.g., as shown in FIG. 3b, 5b, 8c-e, or 9a-d) and suitable mathematical calibration/correlation (e.g., utilizing principal component analysis). In one implementation, foreknowledge that the user intends to utilize a whole-hand power grasp could permit the relative opening of the whole-hand grasp to be determined by a fewer proximity sensors or the average across multiple proximity sensors (e.g., with sensor elements located at positions 3 and/or 4 in FIG. 8c, where the sensed or averaged values could correlate to the relative state of the whole hand grasp, from fully open to fulling closed and a continuous set of values between these states). One could also simply use a single, large sense electrode if only a single degree of freedom is to be controlled by measuring the user's hand position and/or grasp state. As another example, one could use pre-knowledge that a user wanted to perform a task with a pinch grasp, such that the simulated hand motion may only utilize the input from the $1^{st}$ and $2^{nd}$ sensors and map these normalized sensor values to the index and thumb positions, respectively, and only allow motions of the index finger and thumb on the computer model.

The same approaches for sensing finger position above could also be used as an input for a game or other system input. For example, one could provide a virtual trigger input for a first-person shooter video game by measuring the position/pose of the index finger and mapping this to trigger pull (e.g., an index finger grasp state of 0 would show the user's finger as extended and off the trigger and as the index finger grasp state approaches 0, the user's in-game finger could be animated to first come into contact with the trigger and then start to pull the trigger, where gun could be made to shoot for a grasp state in the range of 0.5-0.75 out of 1). In another example, the hands grasp state could be used to pick up and set down objects in the game such as food, weapons, keys, or to grasp objects such as a door knob for opening or closing an in-game door. In another example, the grasp sensing can be used to convey hand gestures to other users, such as waving or pointing to a location of interest.

Figure 1:
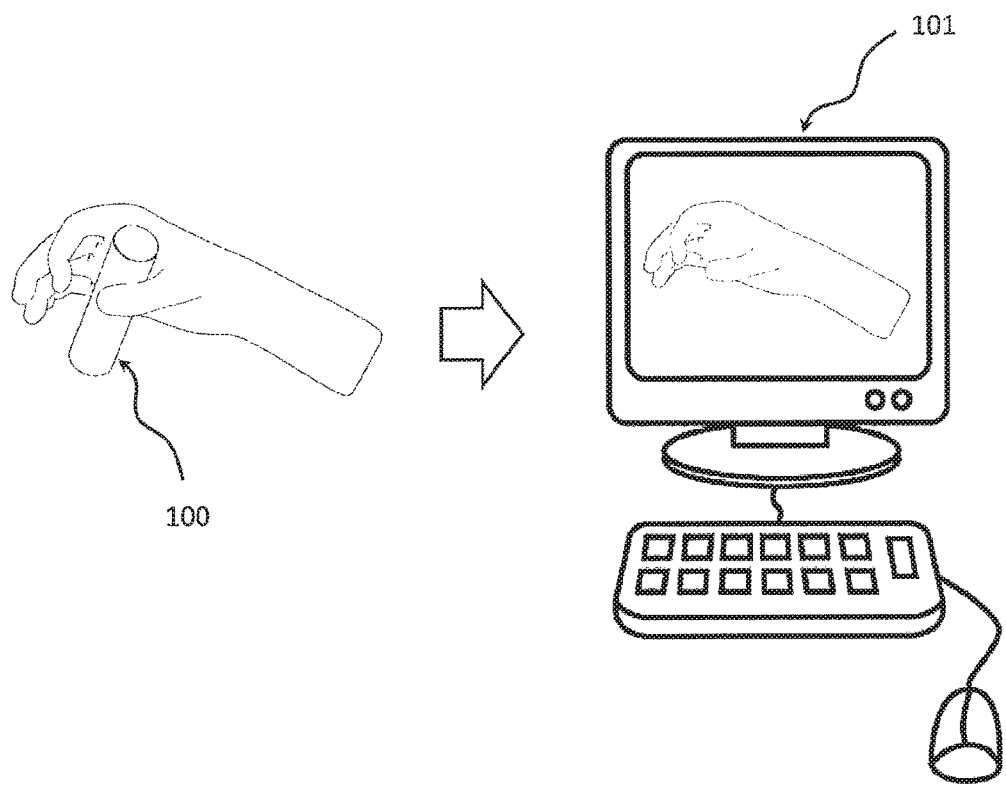
FIG. 1 is a schematic diagram depicting the measurement of finger/hand position and/or hand pose from an instrumented grasped device and communication of this hand position data to a computing device.
Figure 12:
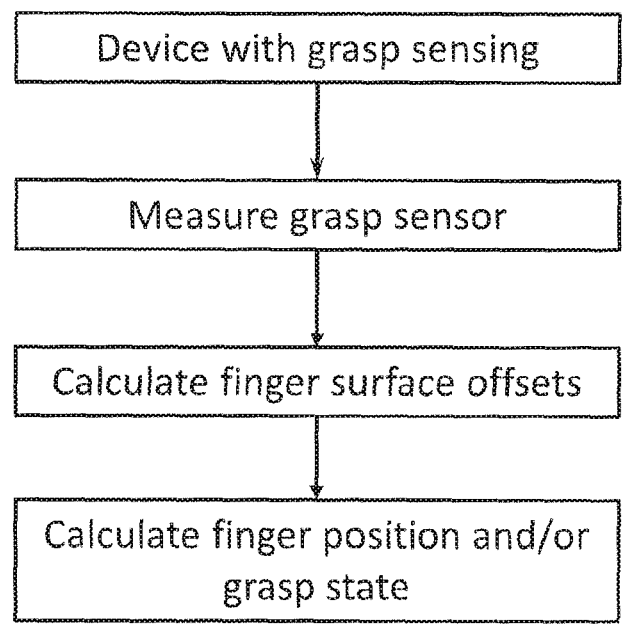
FIG. 12 is a flowchart depicting a method of use of embedded grasp sensing embedded in a device in accordance with the present disclosure.

FIG. 12 portrays a grasp sensing system, starting with a sensorized device. As described in the flow of this diagram, a variety of sensor types, sizes and spacing of these sensors can be used. An array of analog electrical signals are measured, one at each sensor location, and converted to a digital value suitable for use by a computing device (e.g., personal computer or smart phone). During device use, an initial range of expected sensor values that correlate to a fully open or fully closed grasp are stored in the device memory and/or computer memory (initial "finger surface offsets"). Upon the device being picked up and held by a new user the range of sensor values, as detected by continuous, close proximity by proximity sensors near the palm of the user (e.g., the right side of the device when held by the right hand), the finger surface offsets are adjusted in time to ensure that a fully closed or open grasp state is properly predicted by the device and associated grasp algorithms. Finger position and/or grasp state could be determined through use of a suitable algorithm, which may be validated through comparison to a "truth model" (high-fidelity position measurement) and mathematical correlation (e.g., least squares or principal component analysis). This algorithm may also utilize a kinematic model of the hand and knowledge of the coupled motions of the joints on the fingers to reduce the number of sensor measurements required to predict the position of the fingers (e.g., a single sensor measurement could be used to predict the relative flexion/extension (grasp state) of each finger and this model could assume some relative bend angle of each of the knuckles of each finger, similar to the motion of under-actuated robotic hand designs). Further foreknowledge, such as knowing the user wishes to utilize a pointing gesture, pinch grasp, power grasp, or other hand motion can be incorporated into the hand model to further simplify the hand prediction. A hand avatar can be used to visually represent the relative grasp state of the hand and each of its fingers, as shown in FIG. 1.

Sensor measurements are input into a computer model to estimate the offset of the user's hand from the surface of the device radially outward from the device at the location of each sensor. The individual sensor measurements may then be input into a kinematic model of a robot or anthropomorphic hand model, whose finger states are linearly or non-linearly mapped between grasp states from fully open (0) to fully closed (1). The simplest hand model assigns a single sensor measurement to the motion of an entire finger, mapping from open (0) to a closed (1) grasp state. More complex models could utilize multiple sensor measurements through the handle of the device per finger.

The terms "approximately," "about," and "substantially" as used herein represent an amount close to the stated amount that still performs a desired function or achieves a desired result. For example, the terms "approximately," "about," and "substantially" may refer to an amount that is within less than 10% of, within less than 5% of, within less than 1% of, within less than 0.1% of, and within less than 0.01% of a stated amount.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A device for sensing grasp state or position of a user's hand, the device comprising:
   a housing; and a plurality of proximity sensing elements housed within or on the device configured to sense grasp state or position of the user's hand prior to contact with the device, wherein:

the plurality of proximity sensing elements are distributed non-uniformly within or on the device, the plurality of proximity sensing elements comprise a first sensor that is sensing a first distance between a user's index finger and the first sensor, wherein the first sensor is positioned on the device in a location that is configured to specifically sense the user's index finger, and the plurality of proximity sensing elements comprise a second sensor that is sensing a second distance between a user's middle finger and the second sensor, wherein the second sensor is positioned on the device in a location that is configured to specifically sense the user's middle finger.

2. The device of claim 1, wherein the proximity sensing elements are optical emitter-detector pairs.

3. The device of claim 1, wherein the proximity sensing elements are capacitive sensors.

4. The device of claim 3, wherein the capacitive sensors form an array that is placed within the device and are incorporated into a flexible printed circuit board.

5. The device of claim 1, wherein the proximity sensing elements measure a user's grasp force on the device.

6. The device of claim 1, wherein:

a first proximity sensing element is positioned within or on the device such that it senses a grasp state of position of a user's thumb; and a second proximity sensing element is positioned within or on the device such that it senses a grasp state of position of a user's index finger.

7. The device of claim 6, wherein the proximity sensing elements associated with a user's ring finger, and little finger are relatively larger than proximity sensing elements associated with the user's thumb and the user's index finger.

8. The device of claim 1, wherein the proximity sensing elements measure the distance between the surface and the user's hand at each respective sensor location.

9. The device of claim 1, wherein the proximity sensing elements can be used to estimate the grasp force after the user's hand contacts the device.

10. The device of claim 9, wherein the surface of the device is deformable to enhance the ability to deduce grasp force after contact.

11. A device for sensing grasp state or position of a user's hand, the device comprising:

a housing;

a plurality of proximity sensing elements housed within or on the device configured to sense a distance of a user's hand prior to contact with the device at a plurality of locations;

wherein:

each location of the plurality of locations comprises one or more proximity sensing elements, and a first location comprises one or more proximity sensing elements that are positioned to specifically detect a distance between the device and the user's index finger, and a second location comprises one or more proximity sensing elements that are position to specifically detect a distance between the device and the user's middle finger.

12. The device of claim 11, wherein the first location is configured to detect a grasp state or position of a user's index finger and the second location is configured to detect a grasp state or position of the user's thumb.

13. The device of claim 11, wherein the proximity sensing elements are capacitive sensors.

14. A method for estimating hand pose relative to a sensorized device, the method including:

measuring hand proximity prior to contact with the sensorized device from multiple proximity sensing elements, wherein measuring hand proximity comprises:

receiving a first sensor reading from a first sensor that is sensing a first distance between a user's index finger and the first sensor, wherein the first sensor is positioned on a sensorized device in a location that is configured to specifically sense the user's index finger; and receiving a second sensor reading from a second sensor that is sensing a second distance between a user's middle finger and the second sensor, wherein the second sensor is positioned on the sensorized device in a location that is configured to specifically sense the user's middle finger.

15. The method of claim 14, further comprising incorporating a kinematic hand model to improve the estimation of a user's hand pose.

16. The method of claim 14, wherein the sensorized device includes geometric features that are used on the device to locate the user's hand in a known location to simplify the prediction model for estimating a user's hand pose.

* * * * *